(12) United States Patent
Nakayama et al.

(10) Patent No.: US 8,029,871 B2
(45) Date of Patent: Oct. 4, 2011

(54) METHOD FOR PRODUCING SILICA AEROGEL COATING

(75) Inventors: Hiroyuki Nakayama, Tokyo (JP); Kazuhiro Yamada, Saitama-ken (JP); Yasuhiro Sakai, Saitama-ken (JP); Maki Yamada, Saitama-ken (JP)

(73) Assignee: Hoya Corporation, Tokyo (JP)

( * ) Notice: Subject to any disclaimer, the term of this patent is extended or adjusted under 35 U.S.C. 154(b) by 193 days.

(21) Appl. No.: 11/423,010

(22) Filed: Jun. 8, 2006

(65) Prior Publication Data
US 2006/0281828 A1    Dec. 14, 2006

(30) Foreign Application Priority Data
Jun. 9, 2005    (JP) ................. P2005-169967

(51) Int. Cl.
C09D 1/04      (2006.01)
C09D 127/00    (2006.01)
C08J 3/28      (2006.01)

(52) U.S. Cl. ............ 427/515; 522/77; 522/83; 522/148; 522/172

(58) Field of Classification Search .................. 522/148, 522/99, 96, 182, 111, 77, 83, 172; 427/515
See application file for complete search history.

(56) References Cited

U.S. PATENT DOCUMENTS

| | | | |
|---|---|---|---|
| 3,865,588 A * | 2/1975 | Ohto et al. | 430/18 |
| 4,293,397 A * | 10/1981 | Sato et al. | 522/99 |
| 4,451,634 A * | 5/1984 | Hatanaka et al. | 522/60 |
| 4,530,569 A | 7/1985 | Squire | |
| 4,754,009 A | 6/1988 | Squire | |
| 5,790,742 A * | 8/1998 | Tsubaki et al. | 385/144 |
| 5,824,622 A * | 10/1998 | Harmer et al. | 502/407 |
| 5,948,482 A | 9/1999 | Brinker et al. | |
| 5,949,071 A * | 9/1999 | Ruffner et al. | 250/338.3 |
| 5,990,190 A * | 11/1999 | Nakamura et al. | 522/81 |
| 5,993,898 A | 11/1999 | Nagatsuka | |
| 6,069,186 A * | 5/2000 | Okinoshima et al. | 522/42 |
| 6,166,855 A * | 12/2000 | Ikeyama et al. | 359/580 |
| 6,383,559 B1 * | 5/2002 | Nakamura et al. | 427/180 |
| 6,528,160 B1 | 3/2003 | Takushima | |
| 6,531,180 B1 | 3/2003 | Takushima et al. | |
| 6,663,957 B1 | 12/2003 | Takushima et al. | |
| 6,740,416 B1 * | 5/2004 | Yokogawa et al. | 428/446 |
| 6,985,275 B2 * | 1/2006 | Miyazawa | 359/245 |
| 7,025,647 B2 * | 4/2006 | Miyazawa | 445/24 |

(Continued)

FOREIGN PATENT DOCUMENTS

JP    63-018964    4/1988
(Continued)

OTHER PUBLICATIONS

English language Abstract of JP 63-238111.
(Continued)

*Primary Examiner* — Susan W Berman
(74) *Attorney, Agent, or Firm* — Greenblum & Bernstein, P.L.C.

(57) ABSTRACT

A silica aerogel coating is produced by reacting a wet gel obtained by the hydrolysis and polymerization of alkoxysilane with an organic-modifying agent to form organically modified silica, dispersing the organically modified silica by an ultrasonic treatment to form an organically modified silica dispersion, adding an ultraviolet-curable resin and a photopolymerization initiator to the dispersion to prepare a coating liquid, applying the coating liquid to a substrate, and then irradiating ultraviolet rays to the coated layer.

10 Claims, 1 Drawing Sheet

U.S. PATENT DOCUMENTS

| | | | | |
|---|---|---|---|---|
| 7,285,323 | B2 * | 10/2007 | Sone et al. | 428/212 |
| 7,704,608 | B2 * | 4/2010 | Thies et al. | 428/515 |
| 7,732,496 | B1 * | 6/2010 | Leventis et al. | 516/99 |
| 2004/0132846 | A1 * | 7/2004 | Leventis et al. | 521/99 |
| 2005/0109238 | A1 * | 5/2005 | Yamaki et al. | 106/287.16 |
| 2006/0154044 | A1 * | 7/2006 | Yamada et al. | 428/312.2 |

FOREIGN PATENT DOCUMENTS

| | | |
|---|---|---|
| JP | 63-238111 | 10/1988 |
| JP | 63-238115 | 10/1988 |
| JP | 10-227902 | 8/1998 |
| JP | 10-319209 | 10/1998 |
| JP | 2003-043202 | 2/2003 |
| JP | 2003-119052 | 4/2003 |
| JP | 2004-277540 | 10/2004 |
| JP | 2005-221911 | 8/2005 |
| JP | 2756366 | 8/2005 |
| JP | 2006-11175 | 1/2006 |
| WO | 2004/104113 | 12/2004 |

OTHER PUBLICATIONS

English language Abstract of JP 63-238115.
English language Abstract of JP 2005-221911.
English language Abstract of JP 2003-043202.
English language Abstract of JP 10-227902.
English language Abstract of JP 2003-119052.
U.S. Appl. No. 11/407,907 (Nakayama et al.), filed Apr. 21, 2006.
Japanese Office Action regarding Japanese Application No. 2006-153552, dated Apr. 27, 2011 and English translation thereof.

* cited by examiner

METHOD FOR PRODUCING SILICA AEROGEL COATING

FIELD OF THE INVENTION

The present invention relates to a method for producing a silica aerogel coating having nanometer-sized fine pores, particularly to a method for producing a silica aerogel coating having a low refractive index and excellent toughness and water repellency suitable for an anti-reflection coating.

BACKGROUND OF THE INVENTION

Anti-reflection coatings have conventionally been produced by a physical vapor deposition method such as vacuum vapor deposition, sputtering, ion plating, etc. Because single-layer anti-reflection coatings are designed to have smaller refractive indexes than those of substrates, coating materials having extremely small refractive indexes are desired for anti-reflection coatings formed on substrates having small refractive indexes. Among coatings formed by a physical vapor deposition method, an $MgF_2$ coating has a minimum refractive index of 1.38. However, $MgF_2$ does not have a refractive index of 1.2-1.25, which is ideal for anti-reflection coatings for glass lenses having a refractive index of about 1.5. An anti-reflection coating having a refractive index of 1.2-1.25 exhibits reflectance of less than 1% in a visible-light region having a wavelength of 400-700 nm. However, the anti-reflection coating of $MgF_2$ having a refractive index of 1.38 fails to exhibit reflectance at an ideal level, although less tan 2%.

Liquid-phase methods such as a sol-gel method, an SOG method, etc. are recently used to produce anti-reflection coatings. The liquid-phase methods are advantageous in producing anti-reflection coatings without needing a large apparatus unlike the physical vapor deposition method, and without exposing substrates to high temperatures. However, anti-reflection coatings produced by the liquid-phase methods have refractive indexes near 1.37 at minimum, which is substantially on the same level as those obtained by the physical vapor deposition methods, and there are no large differences in anti-reflection characteristics therebetween. Accordingly, in both methods, low-refractive-index materials and high-refractive-index materials should be laminated to form multi-layer coatings, to have reflectance of less than 1% in a visible-light-wavelength region.

Known as a material having a smaller refractive index than that of magnesium fluoride is silica aerogel. Silica aerogel having a density of 0.01 g/cc or less and a refractive index of less than 1.1 can be formed by preparing a wet silica gel by the hydrolysis of an alkoxysilane, and drying it by an ultra-critical fluid of carbon dioxide, water, an organic solvent, etc. However, this method is highly costly because it needs lengthy steps using an ultra-critical-drying apparatus. In addition, the silica aerogel produced by this method is brittle because of extremely small toughness, failing to be put into practical use.

U.S. Pat. No. 5,948,482 describes a method for producing a thin silica aerogel coating by using a material obtained by (a) preparing a sol containing $SiO_2$, (b) aging it to a gel, (c) modifying its surface with organic groups, and (d) subjecting the organically modified gel to an ultrasonic treatment. This method can produce a silica aerogel coating having a porosity of 99% or more, thus a low refractive index. However, the silica aerogel coating produced by this method has small mechanical strength and poor scratch resistance.

OBJECT OF THE INVENTION

Accordingly, an object of the present invention is to provide a method for producing a silica aerogel coating having a low refractive index and excellent toughness and water repellency, which is suitable for anti-reflection coatings.

DISCLOSURE OF THE INVENTION

As a result of intense research in view of the above object, the inventors have found that a silica aerogel coating having excellent toughness and water repellency and a low refractive index can be obtained by applying a coating liquid comprising organically modified silica, an ultraviolet-curable-resin and an photo-polymerization initiator to a substrate, and polymerizing the ultraviolet-curable resin (or the ultraviolet-curable resin and unsaturated groups of the photo-polymerization initiator) by an ultraviolet irradiation. The present invention has been completed.

Thus, the method of the present invention for producing a silica aerogel coating comprises the steps of forming a layer containing organically modified silica, an ultraviolet-curable resin and a photo-polymerization initiator, and irradiating ultraviolet rays to the layer.

A coating liquid containing the organically modified silica, the ultraviolet-curable resin and the photo-polymerization initiator is preferably applied to a substrate to form the layer. To form the layer, it is preferable to use a controlling obtained by (a) mixing a dispersion containing the organically modified silica with a solution containing the ultraviolet-curable resin and the photo-polymerization initiator, (b) mixing a dispersion containing the organically modified silica and the photo-polymerization initiator with a solution containing the ultraviolet-curable resin, (c) mixing a dispersion containing the organically modified silica and the photo-polymerization initiator with a solution containing the ultraviolet-curable resin and the photo-polymerization initiator or (d) adding the photo-polymerization initiator after a dispersion containing the organically modified silica and a solution containing the ultraviolet-curable resin are mixed.

The ultraviolet-curable resin is preferably cured to have a refractive index of 1.33-1.5. The organically modified silica dispersion is preferably obtained by forming a wet gel by the hydrolysis and polymerization of an alkoxysilane and/or silsesquioxane, reacting the wet gel with an organic-modifying agent, and dispersing the resultant organically modified silica by an ultrasonic treatment. The dispersing medium is preferably at least one selected from the group consisting of carboxylic esters, ketones and alcohols. Solvents for the wet gel are preferably alcohols having 1-3 carbon atoms.

The alkoxysilane is preferably a monosilane having an unsaturated group and an alkoxy group. The organic-modifying agent is preferably a silane coupling agent, more preferably a silane coupling agent having an ultraviolet-polymerizable unsaturated group. The wet gel is preferably formed using a monosilane having an unsaturated group and an alkoxy group as the alkoxysilane, by polymerizing the monosilane to an oligomer in the presence of an acid catalyst, and polymerizing the oligomer in the presence of a base catalyst. After irradiating the layer with ultraviolet rays, it is preferable to bake the layer at 50-150° C.

DESCRIPTION OF THE PREFERRED EMBODIMENTS

Figure 1:
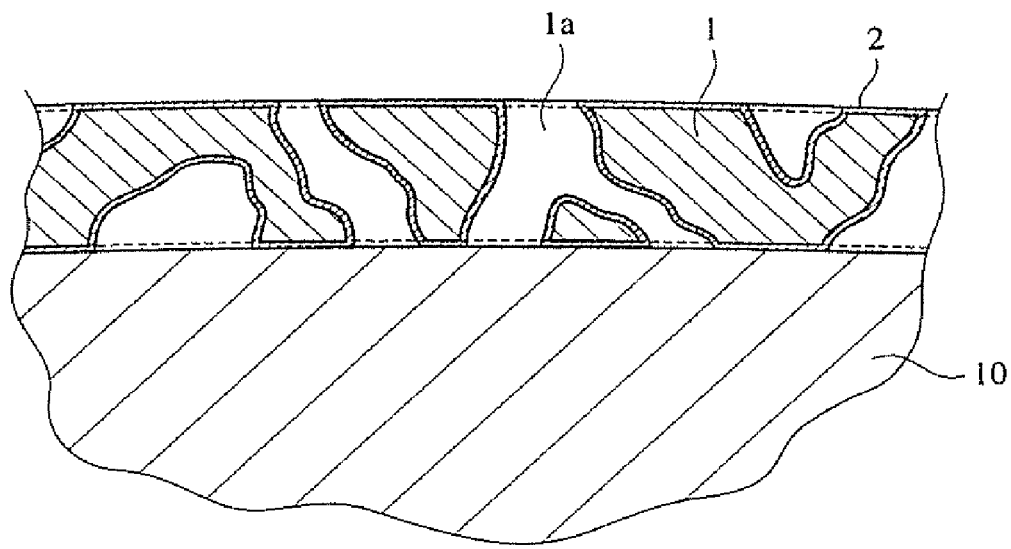
FIG. 1 is a cross-sectional view showing one example of the structure of the silica aerogel coating of the present invention.

[1] Preparation of Organically Modified Silica Dispersion
(1) Formation of Wet Gel The wet gel is formed by dissolving the silica-skeleton-forming compound and the catalyst in a solvent, causing the hydrolysis and polymerization of the silica-skeleton-forming compound, and then conducting aging.

(a) Silica-Skeleton-Forming Compound
(a-1) Saturated Alkoxysilane and Silsesquioxane Silica sol and gel are formed by the hydrolysis and polymerization of alkoxysilane and/or silsesquioxane. The alkoxysilane may be a monomer or an oligomer. The saturated alkoxysilane monomer preferably has 3 or more alkoxy groups. Using a saturated alkoxysilane having 3 or more alkoxy groups as a silica-skeleton-forming compound, anti-reflection coatings with excellent uniformity can be obtained. Specific examples of the saturated alkoxysilane monomers include methyltrimethoxysilane, methyltriethoxysilane, phenyltriethoxysilane, tetramethoxysilane, tetraethoxysilane, tetrapropoxysilane, tetrabutoxysilane, diethoxydimethoxysilane, dimethyldimethoxysilane, and dimethyldiethoxysilane. The saturated alkoxysilane oligomers are preferably polycondensates of these monomers. The saturated alkoxysilane oligomers can be obtained by the hydrolysis and polymerization of the monomers.

The use of a saturated silsesquioxane as a silica-skeleton-forming compound can also provide an anti-reflection coating with excellent uniformity. The saturated silsesquioxane is a general name of polysiloxanes in the form of network, which have structural units represented by the general formula: $RSiO_{1.5}$, wherein R represents an organic functional group. R may be, for instance, a linear or branched alkyl group having 1-6 carbon atoms, a phenyl group, or an alkoxy group (for instance, a methoxy group, an ethoxy group, etc.). It is known that the silsesquioxane has various structures such as a ladder structure, a cage structure, etc. It has excellent weather resistance, transparency and hardness, suitable as a silica-skeleton-forming compound for the silica aerogel.

(a-2) Unsaturated Alkoxysilane Monomer and Silsesquioxane

An unsaturated monomer or oligomer of alkoxysilane or silsesquioxane having an ultraviolet-polymerizable unsaturated group may be used as a silica-skeleton-forming compound. Using the silica-skeleton-forming compound having an unsaturated group, a silica aerogel coating with excellent toughness can be obtained even when a small amount of a binder is added. The unsaturated alkoxysilane monomer has an organic group having at least one double or triple bond (hereinafter referred to as "unsaturated group"), and an alkoxy group. The unsaturated group has 2-10 carbon atoms, preferably 2-4 carbon atoms.

The preferred unsaturated alkoxysilane monomer is represented by the following general formula (1);

$$R^a Si(OR^b)_3 \qquad (1),$$

wherein $R^a$ represents an organic group having an unsaturated bond and 2-10 carbon atoms, and $R^b O$ represents an alkoxy group having 1-4 carbon atoms.

The unsaturated group $R^a$ is an organic group having at least one ultraviolet-polymerizable unsaturated bond, which may have a substituting group such as a methyl group, an ethyl group, etc. Specific examples of the unsaturated group $R^a$ include a vinyl group, an allyl group, a methacryloxy group, an aminopropyl group, a glycidoxy group, an alkenyl group and a propargyl group. $R^b$ is an organic group, which may be the same as or different from $R^a$. Specific examples of the alkoxy group $R^b O$ include a methoxy group, an ethoxy group, a propoxy group, a butoxy group, an isopropoxy group and an s-butoxy group.

Specific examples of the unsaturated alkoxysilane monomers include trimethoxyvinylsilane, triethoxyvinylsilane, allyltrimethoxysilane, allyltriethoxysilane, tributoxyvinylsilane, tripropoxyvinylsilane, allyltributoxysilane, allyltripropoxysilane, dimethoxydivinylsilane, diallyldimethoxysilane, diethoxydivinylsilane, diallyldiethoxysilane, trimethoxy(3-butenyl)silane, triethoxy(3-butenyl)silane, di(3-butenyl)dimethoxysilane, and di(3-butenyl)diethoxysilane.

An oligomer of the unsaturated alkoxysilane having an unsaturated group may be used as a silica-skeleton-forming compound. The unsaturated alkoxysilane oligomer also has at least one unsaturated group and at least one alkoxy group. The unsaturated alkoxysilane oligomer having an unsaturated group is preferably represented by the following general formula (2);

$$Si_m O_{m-1} R^a{}_{2m+2-x} OR^b{}_x \qquad (2),$$

wherein $R^a$ represents an organic group having an unsaturated bond and 2-10 carbon atoms, $R^b O$ represents an alkoxy group having 1-4 carbon atoms, m represents an integer of 2-5, and x represents an integer of 4-7. Preferred examples of the unsaturated groups $R^a$ and the alkoxy groups $R^b O$ are the same as those in the above alkoxysilane monomers.

The number m of condensation is preferably 2-3. An oligomer whose number m of condensation is 5 or less can be easily obtained by the polymerization of the monomer using an acidic catalyst as described below. The number x of the alkoxy group is preferably 3-5. When the number x of the alkoxy group is less than 3, the hydrolysis and polycondensation of the alkoxysilane does not sufficiently proceed, making three-dimensional cross-linking difficult to occur, thereby making the formation of a wet gel too difficult. When the number x of the alkoxy group is more than 5, the percentage of the unsaturated group is too small, resulting in insufficient increase in mechanical strength by the polymerization. Specific examples of the unsaturated alkoxysilane oligomers having unsaturated groups include disilanes, trisilanes and tetrasilanes obtained by the condensation of the above unsaturated alkoxysilane monomers.

(b) Solvent

The solvent is preferably composed of water and alcohol. The alcohol is preferably methanol, ethanol, n-propyl alcohol, and isopropyl alcohol, particularly methanol. How active the hydrolysis and polycondensation reaction are depends on a molar ratio of the monomer and/or oligomer of alkoxysilane or silsesquioxane (silica-skeleton-forming compound) to water. Though the water/alcohol molar ratio does not directly affect the hydrolysis and polycondensation reaction, it is preferably substantially 0.1-2. When the water/alcohol molar ratio is more than 2, the hydrolysis proceeds too quickly. When the water/alcohol molar ratio is less than 0.1, the hydrolysis of the silica-skeleton-forming compound does not sufficiently occur.

(c) Catalyst

A catalyst for the hydrolysis reaction is added to an aqueous solution of the silica-skeleton-forming compound. The catalyst may be acidic or basic. For instance, an efficient hydrolysis can be proceeded by condensing the silica-skeleton-forming compound monomer to an oligomer in an aqueous solution containing an acidic catalyst, and polymerizing the oligomer in a solution containing a basic catalyst. Specific examples of the acidic catalysts include hydrochloric acid, nitric acid and acetic acid. Specific examples of the basic catalysts include ammonia, amines, NaOH and KOH. Preferred examples of the amines include alcohol amines, and alkyl amines (for instance, methylamine, dimethylamine, trimethylamine, n-butylamine, and n-propylamine).

(d) Formulation

The silica-skeleton-forming compound is preferably dissolved in the solvent, such that a molar ratio of the solvent to alkoxysilane is 3-100. When the molar ratio is less than 3, the degree of polymerization of the alkoxysilane is too high. When the molar ratio exceeds 100, the degree of polymerization of the alkoxysilane becomes too low. A catalyst/alkoxysilane molar ratio is preferably $1 \times 10^{-7}$ to $1 \times 10^{-1}$, more preferably $1 \times 10^{-2}$ to $1 \times 10^{-1}$. When the molar ratio is less than $1 \times 10^{-7}$, the hydrolysis of the alkoxysilane does not occur sufficiently. Even at a molar ratio of more than $1 \times 10^{-1}$, increased catalytic effects cannot be obtained. A water/alkoxysilane molar ratio is preferably 0.5-20, more preferably 5-10.

(e) Aging

A solution containing the silica-skeleton-forming compound condensed by hydrolysis is left to stand or slowly stirred for aging at 25-90° C. for about 20-60 hours. Gelation proceeds by aging, to form a wet gel containing silicon oxide. The term "wet gel containing silicon oxide" used herein means a wet gel containing silicon oxide particles and a solvent.

(2) Substitution of Dispersing Medium

A dispersing medium of the wet gel influences a surface tension and/or a contact angle of a solid phase to a liquid phase, which accelerate or retard aging, an extent of surface modification in the organic modification step, and an evaporation rate of the dispersing medium in the later-described coating step. The dispersing medium contained in the gel can be substituted by another dispersing medium by repeating an operation of pouring another dispersing medium into the gel, vibrating the gel and conducting decantation. The substitution of the dispersing medium may be conducted before or after an organic modification reaction, though it is preferably conducted before the organic modification reaction to reduce the number of steps.

Specific examples of the substituting dispersing media include ethanol, methanol, propanol, butanol, hexane, heptane, pentane, cyclohexane, toluene, acetonitrile, acetone, dioxane, methyl isobutyl ketone, propylene glycol monomethyl ether, ethylene glycol mono methyl ether, and ethyl acetate. These dispersing media may be used alone or in combination.

The preferred substituting dispersing media are ketones. Substitution with a ketone solvent before the later-described ultrasonic treatment step makes it possible to obtain a well-dispersible, organically modified, silica-containing sol. Because the ketone solvent has excellent affinity for silica (silicon oxide) and organically modified silica, organically modified silica is well dispersed in the ketone solvent. The preferred ketone solvent has a boiling point of 60° C. or higher. Ketones having boiling points of lower than 60° C. are evaporated too much in the later-described ultrasonic irradiation step. For instance, acetone used as a dispersing medium is much evaporated during the ultrasonic irradiation, resulting in difficulty in controlling the concentration of the dispersion. Acetone is quickly evaporated in the coating step, too, failing to keep a sufficient coating time. It is further known that acetone is harmful to humans, unpreferable for the health of an operator.

Particularly preferred as the ketone solvent is unsymmetrical ketone having different groups on both sides of a carbonyl group. Because nonsymmetrical ketone has a large polarity, it has excellent affinity particularly for silica and organically modified silica. The organically modified silica preferably has a particle size of 200 nm or less in the dispersion. When the particle size of the organically modified silica is more than 200 nm, it is difficult to form a silica aerogel coating having a substantially smooth surface.

The ketone may have an alkyl or aryl group. The preferred alkyl group has about 1-5 carbon atoms. Specific examples of the ketone solvents include methyl isobutyl ketone, ethyl isobutyl ketone, and methyl ethyl ketone.

(3) Organic Modification (a) Organic-Modifying Agents

An organic-modifying agent solution is added to the wet gel, so that hydrophilic groups such as a hydroxyl group, etc. at the end of silicon oxide constituting the wet gel are substituted by hydrophobic organic groups. To conduct the reaction of the wet gel with the organic-modifying agent efficiently, the organic-modifying agent solution is preferably added to the wet gel diced to about 5-30 mm each to have a larger surface area.

(a-1) Saturated Organic-Modifying Agents

The preferred saturated organic-modifying agent is a compound represented by the following formulae (3)-(8);

  (3),

  (4),

  (5),

  (6),

  (7), and

  (8), wherein p represents an integer of 1-3, q represents an integer of 1-3 satisfying the condition of q=4−p, $R^bO$ represents an alkoxy group having 1-4 carbon atoms, and $R^c$ represents hydrogen, a substituted or unsubstituted alkyl group having 1-18 carbon atoms, or a substituted or unsubstituted aryl group having 5-18 carbon atoms, or a mixture thereof.

Specific examples of the saturated organic-modifying agents include triethylchlorosilane, trimethylchlorosilane, diethyldichlorosilane, dimethyldichlorosilane, acetoxytrimethylsilane, acetoxysilane, diacetoxydimethylsilane, methyltriacetoxysilane, phenyltriacetoxysilane, diphenyldiacetoxysilane, trimethylethoxysilane, trimethylmethoxysilane, 2-trimethylsiloxy pent-2-en-4-one, N-(trimethylsilyl) acetamide, 2-(trimethylsilyl) acetate, N-(trimethylsilyl) imidazole, trimethylsilyl propiolate, nonamethyltrisilazane, hexamethyldisilazane, hexamethyldisiloxane, trimethylsilanol, triethylsilanol, triphenylsilanol, t-butyldimethylsilanol, diphenylsilanediol, etc.

(a-2) Organic-Modifying Agents Having Unsaturated Groups

Using the unsaturated organic-modifying agent, a silica aerogel coating with excellent toughness can be obtained even when a small amount of a binder is added. Preferred examples of the unsaturated organic-modifying agents are represented by the following formulae (9)-(14);

 (9),

 (10),

 (11),

 (12),

 (13),

 (14), wherein p represents an integer of 1-3, q represents an integer of 1-3 meeting the condition of q=4−p, and $R^d$ represents an organic group having an ultraviolet-polymerizable, unsaturated bond and 2-10 carbon atoms. The unsaturated group $R^d$ may have a methyl group, an ethyl group, etc. Examples of the unsaturated group $R^d$ include a vinyl group, an allyl group, a methacryloxy group, an aminopropyl group, a glycidoxy group, an alkenyl group, and a propargyl group. The unsaturated organic-modifying agent may be used alone or in combination. The unsaturated organic-modifying agent may be combined with the saturated organic-modifying agent.

The unsaturated organic-modifying agent is preferably unsaturated chlorosilane, more preferably unsaturated monochlorosilane having three unsaturated groups. Specific examples of the unsaturated organic-modifying agents having unsaturated groups include triallylchlorosilane, diallyldichlorosilane, triacetoxyallylsilane, diacetoxydiallylsilane, trichlorovinylsilane, dichlorodivinylsilane, triacetoxyvinylsilane, diacetoxydiallylsilane, trimethoxy (3-butenyl) silane, triethoxy(3-butenyl)silane, di(3-butenyl)dimethoxysilane, di(3-butenyl)diethoxysilane, etc.

(b) Organic Modification Reaction

The organic-modifying agent is preferably dissolved in a solvent such as hydrocarbons such as hexane, cyclohexane, pentane, heptane, etc.; ketones such as acetone, etc.; aromatic compounds such as benzene, toluene, etc. The organic modification is preferably conducted at 10-40° C., although variable depending on the type and concentration of the organic-modifying agent. When the organic-modifying temperature is lower than 10° C., the organic-modifying agent does not easily react with silicon oxide. When it is higher than 40° C., the organic-modifying agent easily reacts with other substances than silicon oxide. The solution is preferably stirred to avoid a distribution in temperature and concentration in the solution during the reaction. For instance, when the organic-modifying agent solution is a solution of triethylchlorosilane in hexane, holding at 10-40° C. for about 20-40 hours (for instance, 30 hours) sufficiently turns a silanol group to a silyl group.

(4) Ultrasonic Treatment

The ultrasonic treatment turns the organically modified silica gel or sol to be suitable for coating. In the case of the organically modified silica gel, the ultrasonic treatment dissociates a gel coagulated by an electric force or a van der Waals force, and destroys covalent bonds of silicon to oxygen, resulting in a dispersed gel. In the case of the sol, too, the ultrasonic treatment reduces the agglomeration of colloid particles. The ultrasonic treatment can be conducted in a dispersing apparatus using an ultrasonic vibrator. An ultrasonic radiation frequency is preferably 10-30 kHz, and an output is preferably 300-900 W.

The ultrasonic treatment time is preferably 5-120 minutes. Longer ultrasonic irradiation results in finer pulverization of clusters of the gel or the sol, resulting in less agglomeration. Accordingly, colloid particles of organically modified silicon oxide are almost in a single dispersion state in the silica-containing sol obtained by the ultrasonic treatment. When the ultrasonic treatment time is shorter than 5 minutes, the colloid particles are not sufficiently dissociated. Even if the ultrasonic treatment time were longer than 120 minutes, the dissociation of the colloid particles of the organically modified silicon oxide would not substantially change.

To form a silica aerogel coating having a porosity of 79-57% and a refractive index of 1.1-1.2, the ultrasonic radiation frequency is preferably 10-30 kHz, the output is preferably 300-900 W, and the ultrasonic treatment time is preferably 5-120 minutes.

A dispersing medium may be added to provide the silica-containing sol with appropriate concentration and fluidity. The dispersing medium may be added before the ultrasonic treatment, or after conducting the ultrasonic treatment to some extent. A mass ratio of the organically modified silicon oxide to the dispersing medium is preferably 0.1-20%. When the mass ratio of the organically modified silicon oxide to the dispersing medium is outside the range of 0.1-20%, a uniform thin layer cannot be formed easily.

The use of a sol containing silicon oxide colloid particles having nearly single dispersion can form an organically modified silica aerogel layer with small porosity. On the other hand, the use of a sol containing largely agglomerated colloid particles can form a silica aerogel layer with large porosity. Thus, the ultrasonic treatment time influences the porosity of the silica aerogel coating. The coating of the sol ultrasonic-treated for 5-120 minutes can provide the organically modified silica aerogel layer with a porosity of 25-90%.

[2] Preparation of Ultraviolet-Curable Resin Solution

The ultraviolet-curable resin functioning as a binder for the organically modified silica preferably has compatibility with a dispersion of the organically modified silica. As long as solvents can dissolve the ultraviolet-curable resin and are compatible with the organically modified silica dispersion, they are not restricted. Accordingly, they may be properly selected from those described above as the substituting dispersion media for the organically modified silica dispersion.

The ultraviolet-curable resin has a refractive index of preferably 1.5 or less, more preferably 1.3-1.4 after curing. Using an ultraviolet-curable resin having a refractive index of 1.5 or less after curing, a silica aerogel coating having a refractive index of 1.2-1.3 can be formed. Ultraviolet-curable, amorphous fluororesins preferably have a refractive index of 1.5 or less and excellent transparency. Specific examples of the ultraviolet-curable, amorphous fluororesins include fluoroolefin copolymers, fluorine-containing cycloaliphatic polymers, fluoroacrylate copolymers, etc.

An example of the fluoroolefin copolymer comprises 37-48% by mass of tetrafluoroethylene, 15-35% by mass of vinylidene fluoride, and 26-44% by mass of hexafluoropropylene.

Polymers having a fluorine-containing cycloaliphatic structure include those obtained by polymerizing monomers having a fluorine-containing cycloaliphatic structure, and those obtained by the ring-forming polymerization of fluorine-containing monomers having at least two polymerizable double bonds. The polymers obtained by the polymerization of monomers having a fluorine-containing ring structure are described in JP63-18964B, etc. They are obtained by the homo-polymerization of monomers having a fluorine-containing ring structure, such as perfluoro(2,2-dimethyl-1,3-dioxole), etc., or by their copolymerization with radically polymerizable monomers such as tetrafluoroethylene, etc.

The polymers obtained by the ring-forming polymerization of fluorine-containing monomers having at least two polymerizable double bonds are described in JP63-238111 A, JP63-238115 A, etc. They are obtained by the ring-forming polymerization of monomers such as perfluoro(allyl vinyl ether), perfluoro(butenyl vinyl ether), etc., or by their copolymerization with radically polymerizable monomers such as tetrafluoroethylene, etc. Examples of the copolymers include those obtained by the copolymerization of monomers having a fluorine-containing ring structure, such as perfluoro(2,2-dimethyl-1,3-dioxole), etc., with fluorine-containing monomers having at least two polymerizable double bonds, such as perfluoro(allyl vinyl ether), perfluoro(butenyl vinyl ether), etc.

The binder may be made of a resin other than the fluororesin, or a combination of the fluororesin and the other resin. The resins other than the fluororesin may be acrylic resins, silicone resins, epoxy resins or urethane resins.

[3] Preparation of Coating Liquid

The coating liquid comprises the organically modified silica, one or more ultraviolet-curable resins, and the photo-polymerization initiator. The coating liquid can be obtained by (a) mixing a dispersion containing the organically modified silica with a solution containing the ultraviolet-curable resin and the photo-polymerization initiator, (b) mixing a dispersion containing the organically modified silica and the photo-polymerization initiator with a solution containing the ultraviolet-curable resin, (c) mixing a dispersion containing the organically modified silica and the photo-polymerization initiator with a solution containing the ultraviolet-curable resin and the photo-polymerization initiator, or (d) adding the photo-polymerization initiator after a dispersion containing the organically modified silica and a solution containing the ultraviolet-curable resin are mixed. The percentage of the organically modified silica in the dispersion before mixing is preferably 0.1-20% by mass per the dispersing medium as described above. When the binder is a fluoroolefin copolymer, the concentration of the copolymer is preferably 0.5-2.0% by mass.

The organically modified silica dispersion and the ultraviolet-curable resin solution are mixed preferably such that a volume ratio of the organically modified silica to the ultraviolet-curable resin is 9:1-1:9 in the coating liquid. When the volume ratio of the ultraviolet-curable resin is more than 90% in the coating liquid, the pores of the silica aerogel are filled with the resin, resulting in the silica aerogel coating with too high a refractive index. When the volume ratio of the ultraviolet-curable resin is less than 10%, a binder ratio is too low to provide the silica aerogel coating with toughness.

The photo-polymerization initiator is added to such an extent that the ultraviolet-curable resin, or the ultraviolet-curable resin and the unsaturated groups of the organically modified silica can be polymerized, in an ultraviolet irradiation step described later. The photo-polymerization initiator may be added to the ultraviolet-curable resin solution and/or the organically modified silica dispersion in advance, or after they are mixed. The amount of the photo-polymerization initiator is preferably 1-15% by mass per the coating liquid on a solid basis.

Specific examples of the photo-polymerization initiators include benzoin and its derivatives such as benzoin methyl ether, benzoin isopropyl ether, benzoin isobutyl ether, etc.; benzyl derivatives such as benzyl dimethyl ketal, etc.; alkyl phenones such as acetophenone, 2,2-dimethoxy-2-phenylacetophenone, 2,2-diethoxy2-phenylacetophenone, 1,1-dichloracetophenone, 1-hydroxycyclobexyl phenyl ketone, 2-methyl-1-[4-(methylthio)phenyl]-2-morpholinopropane-1-on, etc.; anthraquinone and its derivatives such as 2-methylanthraquinone, 2-chloroanthraquinone, 2-ethylanthraquinone, 2-t-butylanthraquinone, etc.; thioxanthone and its derivatives such as 2,4-dimethylthioxanthone, 2-chlorothioxanthone, etc.; benzophenone and its derivatives such as N,N-dimethylamino-benzophenone, etc.

[4] Formation of Silica Aerogel Coating (1) Coating

When the coating liquid is applied to a substrate, a dispersing medium is evaporated to form a layer composed of the organically modified silica, the ultraviolet-curable resin and the photo-polymerization initiator. Examples of coating methods include a spray-coating method, a spin-coating method, a dip-coating method, a flow-coating method and a bar-coating method. The preferred coating method is a spray-coating method, which can form a sol layer containing organically modified silica in uniform thickness even on a rugged surface.

(2) Drying

Because the coating liquid contains a volatile solvent, it may be spontaneously dried, but its drying may be accelerated by heating at 50-100° C. Although the organically modified silica aerogel layer has a porosity reduced by the shrinkage of the gel due to capillary pressure during the evaporation of the dispersing medium, the porosity is recovered by a springback phenomenon after the completion of evaporation. Thus, the porosity of the dried, organically modified silica aerogel layer is substantially as large as the original one of the gel network. The shrinkage of a silica gel network and the springback phenomenon are described in U.S. Pat. No. 5,948,482 in detail.

(3) Ultraviolet Irradiation

When ultraviolet rays are irradiated to the coating containing the organically modified silica, the ultraviolet-curable resin and the photo-polymerization initiator, the ultraviolet-curable resin, or the ultraviolet-curable resin and the unsaturated groups of the organically modified silica are polymerized. Using an ultraviolet irradiation apparatus, the coating is preferably subjected to ultraviolet irradiation at about 50-10000 mJ/cm$^2$. The ultraviolet irradiation time is preferably about 1-30 seconds when the silica aerogel coating is as thick as about 10-2000 nm, although variable depending on the coating thickness.

(4) Baking

The coating is preferably baked at 50-150° C. The baking removes a solvent from the layer and a hydroxyl group, etc. from the surface, thereby strengthening the coating. Because decomposition does not substantially occur at a baking temperature of about 50-150° C., the baked silica aerogel coating has a cured resin formed by the polymerization of the ultraviolet-curable resin or the ultraviolet-curable resin and the unsaturated groups of the organically modified silica.

[5] Structure and Properties of Silica Aerogel Coating

FIG. 1 schematically shows the cross section of the silica aerogel coating of the present invention. The silica aerogel coating is a porous film comprising an organically modified silica aerogel 1 having Si—O—Si bonds, and a cured resin layer 2 obtained by ultraviolet polymerization. Because the silica aerogel coating can be formed without heating to high temperatures, a substrate 10, on which the silica aerogel coating is formed, may not be heat-resistant, like polyolefins, etc. Although the cured resin layer 2 formed by ultraviolet polymerization covers the surface and pores of the organically modified silica aerogel 1, the pores of the organically modified silica aerogel 1 are not completely filled. Accordingly, the silica aerogel coating has nanometer-sized pores 1a.

The refractive index of the silica aerogel coating varies depending on the porosity. The larger the porosity, the smaller the refractive index, and vice versa. The refractive index also depends on a volume ratio of the organically modified silica aerogel 1 to the cured resin layer 2; the higher the volume ratio of the organically modified silica aerogel 1, the smaller the refractive index, and vice versa. The refractive index of the silica aerogel coating is adjustable in a range of 1.15-1.35. For instance, when the volume ratio of the organically modified silica aerogel 1 to the cured resin layer 2 is 2-1-1:2, the refractive index can be 1.2-1.35.

The thickness of the silica aerogel coating may be in a range not adversely affecting the baking and the ultraviolet irradiation. When used as an anti-reflection coating, the thickness of the silica aerogel coating is about 50-150 nm. The thickness of the silica aerogel coating may be properly controlled by the concentration of the organically modified silica-containing sol, the number of spraying operations, etc.

The organically modified silica aerogel coating is hydrophobic, with excellent durability. This seems to be due to the fact that the silica aerogel coating has few hydroxyl groups on the surface, so that water does not easily enter into fine pores. The silica aerogel coating containing the cured resin layer 2 has excellent toughness and water repellency.

The present invention will be explained in more detail referring to Examples below without intention of restricting the present invention thereto.

Example 1

Saturated Alkoxysilane (Silica-Skeleton-Forming Compound)+Saturated Chlorosilane (Organic-Modifying Agent)+Ultraviolet-Curable Resin (1-i) Preparation of Wet Silica Gel After 5.21 g of tetraethoxysilane was mixed with 4.38 g of ethanol, 0.4 g of hydrochloric acid (0.01 N) was added thereto, and the resultant mixture was stirred for 90 minutes. Thereafter, 44.3 g of ethanol and 0.5 g of an aqueous ammonia solution (0.02 N) were added and stirred for 46 hours. The resultant mixed liquid was aged at 60° C. for 46 hours to form a wet gel.

(1-ii) Preparation of Dispersion of Organically Modified Silica

After ethanol was added to the wet silica gel and vibrated for 10 hours, unreacted products, etc. were removed by decantation, and a dispersing medium for the wet silica gel was substituted with ethanol. Methyl isobutyl ketone (MIBK) was then added to the ethanol-dispersed wet gel and vibrated for 10 hours, and the dispersing medium of ethanol was substituted with MIBK by decantation.

The wet silica gel was mixed with a solution of trimethyl chlorosilane in MIBK (concentration: 5% by volume) and stirred for 30 hours to organically modify silicon oxide at ends. The resultant organically modified wet silica gel was washed by vibration in MIBK for 24 hours and decantation.

MIBK was added to the organically modified wet silica gel to a concentration of 3% by mass, and ultrasonic irradiation (20 kHz, 500 W) was conducted to turn the wet silica gel to a sol-like, organically modified silica (organically modified silica dispersion). The ultrasonic irradiation time was 20 minutes.

(1-iii) Preparation of Ultraviolet-Curable Resin Solution 2-propene-1-ol and perfluoro-3,6-dioxaoctane-1,8-diacid were added stepwise by 0.5 mol each to a mixed solvent of diethyl ether and MIBK, to cause their dehydration condensation reaction. The resultant ester was copolymerized with 1H,1H,6H,6H-perfluoro-1,6-hexanediol diacrylate. The resultant copolymer and 2-methyl-1-[4-(methylthio)phenyl]-2-morpholinopropane-1-on as a photo-polymerization initiator were dissolved in MIBK to prepare a ultraviolet-curable resin solution. The concentration of the copolymer in the ultraviolet-curable resin solution was 10% by mass, and the concentration of the polymerization initiator was 0.5% by mass.

(1-iv) Preparation of Coating Liquid

The organically modified silica dispersion obtained in the step (1-ii) and the ultraviolet-curable resin solution obtained in the step (1-iii) were mixed at a volume ratio of 9:1, to prepare a coating liquid.

(1-v) Dip Coating

The coating liquid was dip-coated on one surface of a silicon substrate, dried at 40° C. for 5 minutes, subjected to ultraviolet irradiation at 1500 mJ/cm$^2$ using an ultraviolet irradiation apparatus available from Fusion Systems, and baked at 150° C. for 1 hour to form a silica aerogel coating.

Example 2

Saturated Alkoxysilane (Silica-Skeleton-Forming Compound)+Saturated Chlorosilane (Organic-Modifying Agent)+Ultraviolet-Curable Resin (2-i) Preparation of Wet Silica Gel 5.90 g of methyl silicate (MS51, having an average structure of a tetramethoxysilane trimer) and 50.55 g of methanol were mixed, and 3.20 g of ammonia water (0.05 N) was added to the resultant mixture and stirred for 30 minutes. The resultant mixed liquid was aged at room temperature for 72 hours to form a wet gel.

(2-ii) Preparation of Organically Modified Silica Dispersion

An organically modified wet silica gel was formed in the same manner as in the step (1-ii) in Example 1, except that the wet gel obtained in the step (2-i) was reacted with trimethylchlorosilane after the dispersing medium in the wet gel was substituted with ethanol and then with MIBK. After MIBK was added to the organically modified wet silica gel to a concentration of 3% by mass, ultrasonic irradiation was carried out in the same manner as in the step (1-ii) in Example 1 to turn the wet silica gel to a sol-like, organically modified silica (organically modified silica dispersion).

(2-iii) Preparation of Coating Liquid

The organically modified silica dispersion obtained in the step (2-ii) and the ultraviolet-curable resin solution prepared in the step (1-iii) in Example 1 were mixed at a volume ratio of 9:1, to prepare a coating liquid.

(2-iv) Dip Coating

The coating liquid was dip-coated on one surface of a silicon substrate, dried at 40° C. for 5 minutes, subjected to ultraviolet irradiation at 1500 mJ/cm$^2$ using an ultraviolet irradiation apparatus available from Fusion Systems, and baked at 150° C. for 1 hour to form a silica aerogel coating.

Example 3

Unsaturated Alkoxysilane (Silica-Skeleton-Forming Compound)+Saturated Chlorosilane (Organic-Modifying Agent)+Ultraviolet-Curable Resin (3-i) Preparation of Wet Silica Gel Having Unsaturated Bond After 6.21 g of 3-methacryloxypropyltrimethoxysilane and 3.04 g of methanol were mixed, 0.4 g of hydrochloric acid (0.01 N) was added, and the resultant mixture was stirred at 60° C. for 3 hours. After 30.8 g of methanol and 0.5 g of an aqueous ammonia solution (0.02 N) were added thereto, the mixture was stirred for 48 hours, and aged at 60° C. for 72 hours to form a wet gel.

(3-ii) Preparation of Organically Modified Silica Dispersion

An organically modified wet silica gel was formed in the same manner as in the step (1-ii) in Example 1, except that the wet gel obtained in the step (3-i) was reacted with trimethylchlorosilane after the dispersing medium in the wet get was substituted with ethanol and then with MIBK. After MIBK was added to the organically modified wet silica gel to a concentration of 1% by mass, ultrasonic irradiation was conducted in the same manner as in the step (1-ii) in Example 1 to turn the wet silica gel to a sol-like, organically modified silica (organically modified silica dispersion). 2-methyl-1-[4-(methylthio)phenyl]-2-morpholinopropane-1-on as a photo-polymerization initiator was added to the organically modified silica dispersion at a concentration of 3% by mass per solid silica.

(3-iii) Preparation of Coating Liquid

The organically modified silica dispersion obtained in the step (3-ii) and the ultraviolet-curable resin solution prepared in the same manner as in the step (1-iii) in Example 1 were mixed at a volume ratio of 9:1, to prepare a coating liquid.

(3-iv) Dip Coating

The coating liquid was dip-coated on a glass substrate, dried at 40° C. for 5 minutes, subjected to ultraviolet irradiation at 1500 mJ/cm$^2$ using an ultraviolet irradiation apparatus available from Fusion Systems, and baked at 150° C. for 1 hour to form a silica aerogel coating.

Example 4

Saturated Alkoxysilane (Silica-Skeleton-Forming Compound)+Unsaturated Chlorosilane (Organic-Modifying Agent)+Ultraviolet-Curable Resin (4-i) Preparation of Wet Silica Gel After 5.90 g of methyl silicate (MS51, having an average structure of a tetramethoxysilane trimer) and 50.55 g of methanol were mixed, 3.20 g of ammonia water (0.05 N) were added. The resultant mixture was stirred for 30 minutes, and aged at room temperature for 72 hours to form a wet gel.

(4-ii) Preparation of Organically Modified Silica Dispersion

An organically modified wet silica gel was produced in the same manner as in the step (1-ii) in Example 1, except that after the dispersing medium in the wet gel obtained in the step (4-i) was substituted with ethanol and then with MIBK, a solution of allyl dimethylchlorosilane in MIBK (concentration: 5% by volume) was added to cause reaction with the wet gel. After MIBK was added to the resultant organically modified wet silica gel to a concentration of 1% by mass, ultrasonic irradiation was conducted in the same manner as in the step (1-ii) in Example 1 to turn the organically modified wet silica gel to a sol-like, organically modified silica (organically modified silica dispersion). 2-methyl-1-[4-(methylthio)phenyl]-2-morpholinopropane-1-on as a photo-polymerization initiator was added to the organically modified silica dispersion at a concentration of 3% by mass per solid silica.

(4-iii) Preparation of Coating Liquid

The organically modified silica dispersion obtained in the step (4-ii) and the ultraviolet-curable resin solution prepared in the same manner as in the step (1-iii) in Example 1 were mixed at a volume ratio of 9:1, to prepare a coating liquid.

(4-iv) Dip Coating

The coating liquid was dip-coated on a glass substrate, dried at 40° C. for 5 minutes, subjected to ultraviolet irradiation at 1500 mJ/cm$^2$ using an ultraviolet irradiation apparatus available from Fusion Systems, and baked at 150° C. for 1 hour to form a silica aerogel coating.

Example 5

Unsaturated Alkoxysilane (Silica-Skeleton-Forming Compound)+Unsaturated Chlorosilane (Organic-Modifying Agent)+Ultraviolet-Curable Resin (5-i) Preparation of Wet Silica Gel Having Unsaturated Bond After 6.21 g of 3-methacryloxypropyltrimethoxysilane was mixed with 3.04 g of methanol, 0.4 g of hydrochloric acid (0.01 N) was added, and the resultant mixture was stirred at 60° C. for 3 hours. After 30.8 g of methanol and 0.5 g of an aqueous ammonia solution (0.02 N) were added, the resultant mixed liquid was stirred for 48 hours, and aged at 60° C. for 72 hours to form a wet gel.

(5-ii) Preparation of Organically Modified Silica Dispersion

An organically modified wet silica gel was formed in the same manner as in the step (1-ii) in Example 1, except that after the dispersing medium in the wet gel obtained in the step (5-i) was substituted with ethanol and then with MIBK, an allyl dimethylchlorosilane solution at a concentration of 5% by volume was added to cause reaction with the wet gel. After MIBK was added to the organically modified wet silica gel to a concentration of 1% by mass, ultrasonic irradiation was conducted in the same manner as in the step (1-ii) in Example 1 to produce a sol-like, organically modified silica (organically modified silica dispersion). 2-methyl-1-[4-(methylthio)phenyl]-2-morpholinopropane-1-on as a photo-polymerization initiator was added to the organically modified silica dispersion at a concentration of 3% by mass per solid silica.

(5-iii) Preparation of Coating Liquid

The organically modified silica dispersion obtained in the step (5-ii) and the ultraviolet-curable resin solution prepared in the same manner as in the step (1-iii) in Example 1 were mixed at a volume ratio of 9:1, to prepare a coating liquid.

(5-iv) Dip Coating

The coating liquid was dip-coated on a glass substrate, dried at 40° C. for 5 minutes, subjected to ultraviolet irradiation at 1500 mJ/cm$^2$ using an ultraviolet irradiation apparatus available from Fusion Systems, and baked at 150° C. for 1 hour to form a silica aerogel coating.

Example 6

Saturated Alkoxysilane/Unsaturated Alkoxysilane at 1:2 (Silica-Skeleton-Forming Compound)+Saturated Chlorosilane (Organic-Modifying Agent)+Ultraviolet-Curable Resin (6-i) Preparation of Wet Silica Gel Having Unsaturated Bond After 2.37 g of methyl silicate (MS51, having an average structure of a tetramethoxysilane trimer), 3.22 g of 3-methacryloxypropyl-trimethoxysilane, and 40.44 g of methanol were mixed, 2.56 g of ammonia water (0.05 N) was added and stirred for 30 minutes. The resultant mixed liquid was aged at room temperature for 72 hours to form a wet gel.

(6-ii) Preparation of Organically Modified Silica Dispersion

An organically modified wet silica gel was formed in the same manner as in the step (1-ii) in Example 1, except that after the dispersing medium in the wet gel obtained in the step (6-i) was substituted with ethanol and then with MIBK, a trimethylchlorosilane solution at a concentration of 5% by volume was added to cause reaction with the wet gel. After MIBK was added to the organically modified wet silica gel to a concentration of 1% by mass, ultrasonic irradiation was conducted in the same manner as in the step (1-ii) in Example 1 to produce a sol-like, organically modified silica (organically modified silica dispersion). 2-methyl-1-[4-(methylthio)phenyl]-2-morpholinopropane-1-on as a photo-polymerization initiator was added to the organically modified silica dispersion at a concentration of 3% by mass per solid silica.

(6-iii) Preparation of Coating Liquid

The organically modified silica dispersion obtained in the step (6-ii) and the ultraviolet-curable resin solution prepared in the same manner as in the step (1-iii) in Example 1 were mixed at a volume ratio of 9:1, to prepare a coating liquid.

(6-iv) Dip Coating

The coating liquid was dip-coated on a glass substrate, dried at 40° C. for 5 minutes, subjected to ultraviolet irradiation at 1500 mJ/cm$^2$ using an ultraviolet irradiation apparatus available from Fusion Systems, and baked at 150° C. for 1 hour to form a silica aerogel coating.

Example 7

Saturated Alkoxysilane/Unsaturated Alkoxysilane at 1:2 (Silica-Skeleton-Forming Compound)+Unsaturated Chlorosilane (Organic-Modifying Agent)+Ultraviolet-Curable Resin (7-i) Preparation of Wet Silica Gel Having Unsaturated Bond After 2.37 g of methyl silicate (MS51, having an average structure of a tetramethoxysilane trimer), 3.22 g of 3-methacryloxypropyl-trimethoxysilane, and 40.44 g of methanol were mixed, 2.56 g of ammonia water (0.05 N) was added and stirred for 30 minutes. The resultant mixed liquid was aged at room temperature for 72 hours to form a wet gel.

(7-ii) Preparation of Organically Modified Silica Dispersion

An organically modified wet silica gel was formed in the same manner as in the step (1-ii) in Example 1, except that the dispersing medium in the wet gel obtained in the step (7-i) was substituted with ethanol and then with MIBK, an allyl dimethylchlorosilane solution at a concentration of 5% by volume was added. After MIBK was added to the organically modified wet silica gel to a concentration of 1% by mass, ultrasonic irradiation was conducted in the same manner as in the step (1-ii) in Example 1 to produce a sol-like, organically modified silica (organically modified silica dispersion). 2-methyl-1-[4-(methylthio)phenyl]-2-morpholinopropane-1-on as a photo-polymerization initiator was added to the organically modified silica dispersion at a concentration of 3% by mass per solid silica.

(7-iii) Preparation of Coating Liquid

The organically modified silica dispersion obtained in the step (7-ii) and the ultraviolet-curable resin solution prepared in the same manner as in the step (1-iii) in Example 1 were mixed at a volume ratio of 9:1, to prepare a coating liquid.

(7-iv) Dip Coating

The coating liquid was dip-coated on a glass substrate, dried at 40° C. for 5 minutes, subjected to ultraviolet irradiation at 1500 mJ/cm$^2$ using an ultraviolet irradiation apparatus available from Fusion Systems, and baked at 150° C. for 1 hour to form a silica aerogel coating.

Example 8

Saturated Alkoxysilane (Silica-Skeleton-Forming Compound)+Saturated Chlorosilane/Unsaturated Chlorosilane at 1:1 (Organic-Modifying Agent)+Ultraviolet-Curable Resin (8-i) Preparation of Wet Silica Gel After 5.90 g of methyl silicate (MS51, having an average structure of a tetramethoxysilane trimer) was mixed with 50.55 g of methanol, 3.20 g of ammonia water (0.05 N) was added and stirred for 30 minutes. The resultant mixed liquid was aged at room temperature for 72 hours to form a wet gel.

(8-ii) Preparation of Organically Modified Silica Dispersion

An organically modified wet silica gel was formed in the same manner as in the step (1-ii) Example 1, except that after the dispersing medium in the wet gel obtained in the step (8-i) was substituted with ethanol and then with MIBK, a solution of trimethylchlorosilane and allyl dimethylchlorosilane in MIBK (MIBK/trimethylchlorosilane/allyl dimethylchlorosilane=90/5/5 by volume) was added. After MIBK was added to the organically modified wet silica gel to a concentration of 1% by mass, ultrasonic irradiation was conducted in the same manner as in the step (1-ii) in Example 1 to produce a sol-like, organically modified silica (organically modified silica dispersion). 2-methyl-1-[4-(methylthio)phenyl]-2-morpholinopropane-1-on as a photo-polymerization initiator was added to the organically modified silica dispersion at a concentration of 3% by mass per solid silica.

(8-iii) Preparation of Coating Liquid

The organically modified silica dispersion obtained in the step (8-ii) and the ultraviolet-curable resin solution prepared in the same manner as in the step (1-iii) in Example 1 were mixed at a volume ratio of 9:1, to prepare a coating liquid.

(8-iv) Dip Coating

The coating liquid was dip-coated on a glass substrate, dried at 40° C. for 5 minutes, subjected to ultraviolet irradiation at 1500 mJ/cm$^2$ using an ultraviolet irradiation apparatus available from Fusion Systems, and baked at 150° C. for 1 hour to form a silica aerogel coating.

Example 9

Unsaturated Alkoxysilane (Silica-Skeleton-Forming Compound)+Saturated Chlorosilane/Unsaturated Chlorosilane at 1:1 (Organic-Modifying Agent)+Ultraviolet-Curable Resin (9-i) Preparation of Wet Silica Gel Having Unsaturated Bond After 6.21 g of 3-methacryloxypropyltrimethoxysilane and 3.04 g of methanol were mixed, 0.4 g of hydrochloric acid (0.01 N) was added, and the resultant mixture was stirred at 60° C. for 3 hours. After 30.8 g of methanol and 0.5 g of an aqueous ammonia solution (0.02 N) were added and stirred for 48 hours, the resultant mixed liquid was aged at 60° C. for 72 hours to form a wet gel.

(9-ii) Preparation of Organically Modified Silica Dispersion

An organically modified wet silica gel was formed in the same manner as in the step (1-ii) in Example 1, except that after the dispersing medium in the wet gel obtained in the step (9-i) was substituted with ethanol and then with MIBK, a solution of trimethylchlorosilane and allyl dimethylchlorosilane in MIBK (MIBK/trimethylchlorosilane/allyl dimethylchlorosilane=90/5/5 by volume) was added. After MIBK was added to the organically modified wet silica gel to a concentration of 1% by mass, ultrasonic irradiation was conducted in the same manner as in the step (1-ii) in Example 1 to produce a sol-like, organically modified silica (organically modified silica dispersion). 2-methyl-1-[4-(methylthio)phenyl]-2-morpholinopropane-1-6n as a photo-polymerization initiator was added to the organically modified silica dispersion at a concentration of 3% by mass per solid silica.

(9-iii) Preparation of Coating Liquid

The organically modified silica dispersion obtained in the step (9-ii) and the ultraviolet-curable resin solution prepared in the same manner as in the step (1-iii) in Example 1 were mixed at a volume ratio of 9:1, to prepare a coating liquid.

(9-iv) Dip Coating

The coating liquid was dip-coated on a glass substrate, dried at 40° C. for 5 minutes, subjected to ultraviolet irradiation at 1500 mJ/cm$^2$ using an ultraviolet irradiation apparatus available from Fusion Systems, and baked at 150° C. for 1 hour to form a silica aerogel coating.

Example 10

Saturated Alkoxysilane/Unsaturated Alkoxysilane at 1:2 (Silica-Skeleton-Forming Compound)+Saturated Chlorosilane/Unsaturated Chlorosilane at 1:1 (Organic-Modifying Agent)+Ultraviolet-Curable Resin (10-i) Preparation of Wet Silica Gel Having Unsaturated Bond After 2.37 g of methyl silicate (MS51, having an average structure of a tetramethoxysilane trimer), 3.22 g of 3-methacryloxypropyl-trimethoxysilane, and 40.44 g of methanol were mixed, 2.56 g of ammonia water (0.05 N) was added. The resultant mixture was stirred for 30 minutes and aged at room temperature for 72 hours to form a wet gel.

(10-ii) Preparation of Organically Modified Silica Dispersion

An organically modified wet silica gel was formed in the same manner as in the step (1-ii) in Example 1, except that after the dispersing medium in the wet gel obtained in the step (10-i) was substituted with ethanol and then with MIBK, a solution of trimethylchlorosilane and allyl dimethylchlorosilane in MIBK (MIBK/trimethylchlorosilane/allyl dimethylchlorosilane=90/5/5 by volume) was added. After MIBK was added to the organically modified wet silica gel to a concentration of 1% by mass, ultrasonic irradiation was conducted in the same manner as in the step (1-ii) in Example 1 to produce a sol-like, organically modified silica (organically modified silica dispersion). 2-methyl-1-[4-(methylthio)phenyl]-2-morpholinopropane-1-on as a photo-polymerization initiator was added to the organically modified silica dispersion at a concentration of 3% by mass per solid silica.

(10-iii) Preparation of Coating Liquid

The organically modified silica dispersion obtained in the step (10-ii) and the ultraviolet-curable resin solution prepared in the same manner as in the step (1-iii) in Example 1 were mixed at a volume ratio of 9:1, to prepare a coating liquid.

(10-iv) Dip Coating

The coating liquid was dip-coated on a glass substrate, dried at 40° C. for 5 minutes, subjected to ultraviolet irradiation at 1500 mJ/cm$^2$ using an ultraviolet irradiation apparatus available from Fusion Systems, and balked at 150° C. for 1 hour to form a silica aerogel coating.

Comparative Example 1

(A-i) Preparation of Organically Modified Silica-Containing Sol

After 5.21 g of tetraethoxysilane was mixed with 4.38 g of ethanol, 0.4 g of hydrochloric acid (0.01 N) was added, and the resultant mixture was stirred for 90 minutes. After 44.3 g of ethanol and 0.5 g of an aqueous ammonia solution (0.02 N) were added, the resultant mixed liquid was stirred for 46 hours and aged at 60° C. for 46 hours to form a wet gel.

After the wet silica gel was mixed with ethanol and vibrated for 10 hours, decantation was conducted to remove unreacted products, etc., and substitute the dispersing medium in the wet gel with ethanol. Further, after MIBK was added and vibrated for 10 hours, the dispersing medium of ethanol was substituted with MIBK by decantation. The wet silica gel was mixed with a solution of trimethylchlorosilane in MIBK (concentration: 5% by volume) and stirred for 30 hours to organically modify silicon oxide at ends. The resultant organically modified wet silica gel was vibrated in MIBK for 24 hours and decanted.

After MIBK was added to the organically modified wet silica gel to a concentration of 1% by mass, ultrasonic irradiation (20 kHz, 500 W) was conducted to turn the organically modified wet silica gel to a sol-like, organically modified silica (organically modified silica dispersion). The ultrasonic irradiation time was 20 minutes.

(A-ii) Dip Coating

The organically modified silica dispersion obtained in the step (A-i) was dip-coated on one surface of a silicon substrate, dried at 40° C. for 5 minutes, and baked at 150° C. for 1 hour to form a silica aerogel coating.

Performance Evaluations

The refractive index, scratch resistance and solvent resistance of the silica aerogel coatings of Examples and Comparative Examples were evaluated as follows.

(1) Scratch Resistance

Each sample was rubbed with a nonwoven fabric to examine how much it was scratched. The evaluation standards are as follows:

Good Not scratched,

Fair Slightly scratched, and

Poor Extremely scratched.

(2) Solvent Resistance

Each sample was rubbed with a nonwoven fabric impregnated with ethanol to examine how much the coating peeled. The evaluation standards are as follows:

Good Not peeled,

Fair Partially peeled, and

Poor Entirely peeled.

The results are shown in Table 1.

TABLE 1

| No. | Refractive Index | Scratch Resistance | Solvent Resistance |
|---|---|---|---|
| Example 1 | 1.21 | Fair | Fair |
| Example 2 | 1.20 | Fair | Fair |
| Example 3 | 1.22 | Fair | Fair |
| Example 4 | 1.22 | Fair | Fair |
| Example 5 | 1.25 | Good | Good |
| Example 6 | 1.25 | Good | Good |
| Example 7 | 1.27 | Good | Good |
| Example 8 | 1.24 | Fair | Fair |
| Example 9 | 1.25 | Good | Good |
| Example 10 | 1.27 | Good | Good |
| Comparative Example 1 | 1.14 | Poor | Poor |

Effect of the Invention

The method of the present invention is advantageous in easily forming a silica aerogel coating comprising organically modified silica and an ultraviolet-cured composition simply by applying a coating liquid containing organically modified silica, an ultraviolet-curable resin and a photo-polymerization initiator to a substrate, and irradiating ultraviolet rays thereto. Because the silica aerogel coating can be formed by a wet method without needing high-temperature baking, it is formed even on a substrate without heat resistance.

The resultant silica aerogel coating advantageously has not only excellent toughness and water repellency because its surface and pore walls are coated with an ultraviolet-polymerized resin, but also a low refractive index because its nanometer-sized pores are not completely filled with the resin. Particularly, the silica aerogel coating having a porosity of 30-53% and containing a binder having a refractive index of 1.365-1.385 has as low a refractive index as 1.2-1.3. Thus, the silica aerogel coating having a low refractive index, a feature of silica aerogel, and excellent toughness and water repellency due to a binder is suitable as an anti-reflection coating.

The present disclosure relates to subject matter contained in Japanese Patent Application No. 2005-169967 filed on Jun. 9, 2005, which is expressly incorporated herein by reference in its entirety.

What is claimed is:

1. A method for producing a silica aerogel coating having fine pores, comprising:
preparing an organically modified wet gel by forming a wet gel by the hydrolysis and polymerization of an alkoxysilane and/or silsesquioxane, and by reacting said wet gel with an organic-modifying agent comprising unsaturated groups;
preparing an organically modified silica-containing sol by dispersing said organically modified wet gel in a dispersing medium by an ultrasonic treatment wherein the ultrasonic radiation frequency is 10-30 kHz, the output is 300-900 W, and the ultrasonic treatment time is 5-120 minutes;
mixing said organically modified silica-containing sol, an ultraviolet-curable fluororesin having a refractive index of 1.5 or less after curing and a photo-polymerization initiator to prepare a coating liquid;
coating and drying said coating liquid on a substrate to evaporate the dispersing medium in said coating liquid, and thereby forming a layer composed of an organically modified silica, said ultraviolet-curable fluororesin and said photo-polymerization initiator;
irradiating ultraviolet rays to said layer to polymerize said ultraviolet-curable fluororesin, and said ultraviolet-curable fluororesin and said organically modified silica, whereby a cured fluororesin layer formed by ultraviolet polymerization of said ultraviolet-curable fluororesin covers the surface and pores of said organically modified silica; and then
baking said layer, and thereby forming said silica aerogel coating having a refractive index of 1.2-1.3.

2. The method for producing a silica aerogel coating according to claim 1, wherein said ultraviolet-curable fluororesin is cured to have a refractive index of 1.33-1.5.

3. The method for producing a silica aerogel coating according to claim 1, wherein a dispersing medium for said dispersion comprises at least one selected from the group consisting of carboxylic esters, ketones and alcohols.

4. The method for producing a silica aerogel coating according to claim 1, wherein a solvent for said wet gel comprises an alcohol having 1-3 carbon atoms.

5. The method of producing a silica aerogel coating according to claim 1, wherein said alkoxysilane comprises a monosilane having an unsaturated group and an alkoxy group.

6. The method for producing a silica aerogel coating according to claim 1, wherein said organic-modifying agent comprises a silane coupling agent.

7. The method for producing a silica aerogel coating according to claim 1, wherein said organic-modifying agent has an ultraviolet-polymerizable unsaturated group.

8. The method for producing a silica aerogel coating according to claim 1, wherein said wet gel is obtained from a monosilane having an unsaturated group and an alkoxy group as said alkoxysilane, by polymerizing said monosilane to an oligomer in the presence of an acid catalyst, and polymerizing said oligomer in the presence of a base catalyst.

9. The method for producing a silica aerogel coating according to claim 1, wherein said layer is baked at 50-150° C.

10. The method for producing a silica aerogel coating according to claim 1, wherein the silica aerogel coating has a porosity of 30-53%.

* * * * *